US006171379B1

United States Patent
Rolland

(10) Patent No.: US 6,171,379 B1
(45) Date of Patent: Jan. 9, 2001

(54) SEPARATOR FOR SEPARATING WATER FROM A WATER DROPLET CONTAINING FLOW OF FLUID

(75) Inventor: Andre Charles Rolland, Epinay sur Seine (FR)

(73) Assignee: Societe d'Etudes et de Constructions Aero-Navales, Gennevilliers (FR)

(*) Notice: Under 35 U.S.C. 154(b), the term of this patent shall be extended for 0 days.

(21) Appl. No.: 09/185,678

(22) Filed: Nov. 4, 1998

(30) Foreign Application Priority Data

Nov. 5, 1997 (FR) .................................. 97 13920

(51) Int. Cl.[7] .................................. B01D 45/08
(52) U.S. Cl. .................. 96/189; 55/434.2; 55/445; 55/462; 55/466
(58) Field of Search .................. 55/442, 443, 445, 55/440, 434.2, 462, 465, 392, 466; 96/188, 189, 190; 165/110, 111

(56) References Cited

U.S. PATENT DOCUMENTS 3,254,475 * 6/1966 Farr et al. ........................... 55/443
3,868,830 * 3/1975 Fletcher et al. ..................... 62/290

FOREIGN PATENT DOCUMENTS

1197198 * 11/1985 (CA) ..................................... 55/440
1092348 * 11/1967 (GB) ..................................... 55/440
2199 260 * 7/1988 (GB) ..................................... 55/440

* cited by examiner

*Primary Examiner*—Duane Smith
*Assistant Examiner*—Robert A. Hopkins
(74) *Attorney, Agent, or Firm*—Leydig, Voit & Mayer, Ltd.

(57) ABSTRACT

The separator is of a type comprising at least one inclined deflecting surface mounted within a fluid flowing path so that water droplets contained in the flow of fluid are separated from the fluid when the fluid is deflected by the deflecting surface. The deflecting surfaces comprise collecting recesses for water that has been separated, which recesses are connected to an under-pressure space in which is maintained an under-pressure with respect to the pressure prevailing in the fluid flowing path.

12 Claims, 2 Drawing Sheets

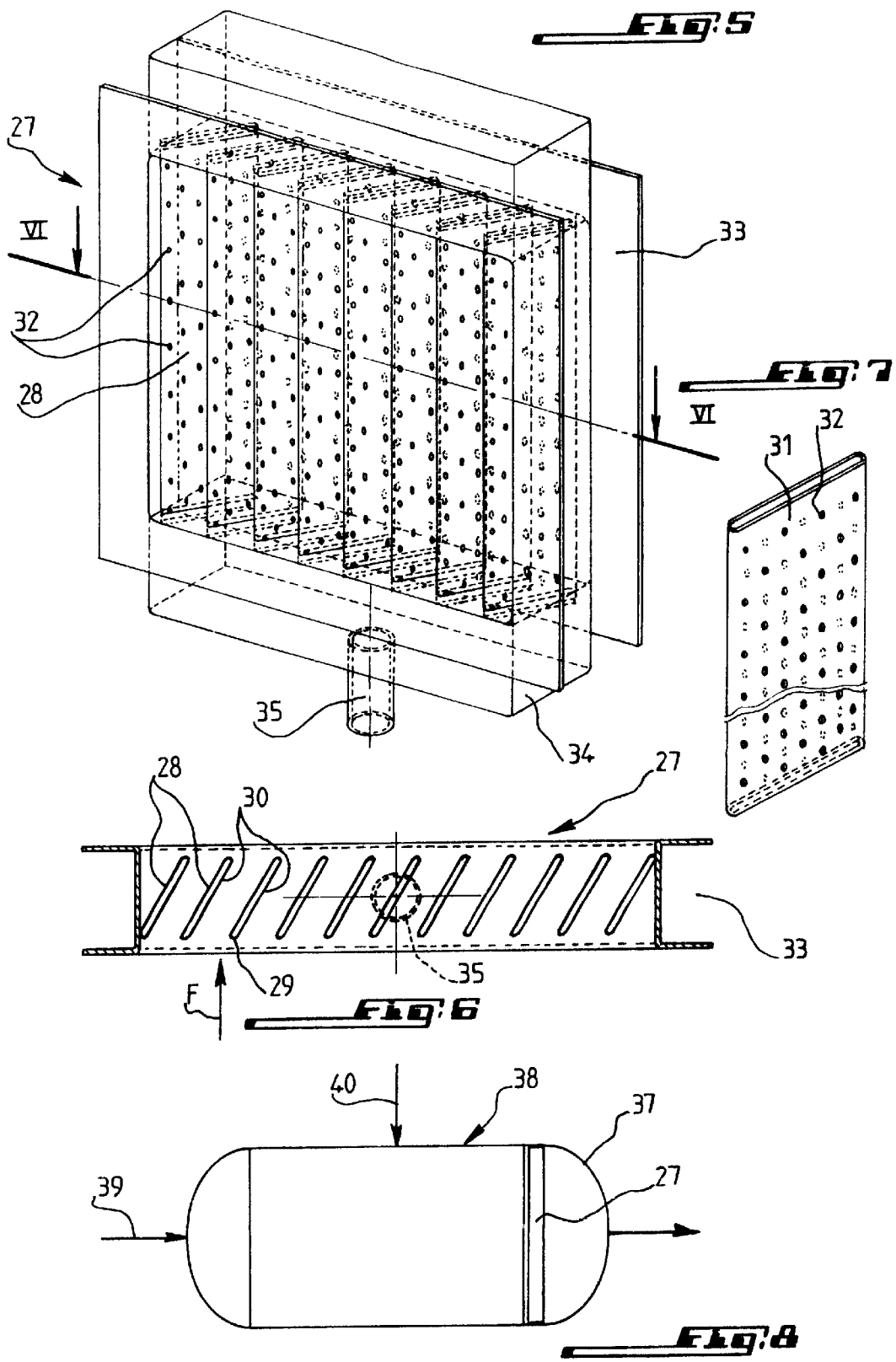

0
SEPARATOR FOR SEPARATING WATER FROM A WATER DROPLET CONTAINING FLOW OF FLUID

FIELD AND PURPOSE OF THE INVENTION

This invention relates to a separator for separating water from a flow of fluid that contains droplets of water, of a type comprising at least one inclined deflecting surface, mounted within a flowing path for the fluid, advantageously shaped as a channel, in such a manner that the droplets are separated from the fluid when this fluid is deflected by the deflecting surface.

Separators of this type are already known. They have however a drawback in that the water which is separated from the flow of fluid and which flows along the deflecting surface is again carried by the fluid along the lower edge of the surface, in particular when the fluid is caused to flow at a high speed.

The present invention has for its purpose to provide a separator of the above defined type which remedies the above mentioned drawback of the known separators.

To reach the above purpose, the separator for separating water from a water droplet containing flow of fluid is characterized in that the deflecting surface comprises collecting recesses connected to an under-pressure space in which prevails an under-pressure with respect to the pressure in a fluid flowing channel.

According to one feature of the invention, the deflecting surface is formed by the surface of at least one hollow plate having a deflecting wall that is provided with traversing recesses and the inside of which communicates with the under-pressure space and a device for collecting water.

According to an advantageous feature of the invention, the deflecting surface is formed by a plurality of inclined hollow plates, arranged so that to be shifted the one with respect to the other, perpendicularly to the flow of fluid, with a slight overlapping, in the axial direction of the flow of fluid, of the downstream and upstream edges of two adjacent plates.

According to another advantageous feature of the invention, the recess is formed by a longitudinal slot arranged near the downstream edge of a deflecting surface.

According to still another advantageous feature of the invention, the deflecting surface is covered with a layer of hydrophilic material for avoiding a formation of droplets of water on the deflecting surface.

According to still another feature of the invention, the separator is placed at the outlet of a heat exchanger, in the transition part from the flowing outlet with great cross sectional area to the flowing sheath of smaller area, the inclined deflecting surface being advantageously formed by portions of the transition part.

BRIEF DESCRIPTION OF THE DRAWINGS

The invention is now examplified with reference to the accompanying drawings, in which:

FIG. 5 is a perspective view of a particularly advantageous embodiment of a separator according to the invention;

FIG. 6 is a cross sectional view taken along line VI—VI of FIG. 5;

FIG. 7 is a perspective view of a deflecting plate of the separator according to FIG. 5; and FIG. 8 is a diagrammatic view illustrating how to use the separator according to FIG. 5 in the outlet manifold of a heat exchanger.

DESCRIPTION OF THE PREFERRED EMBODIMENTS

Figure 1:
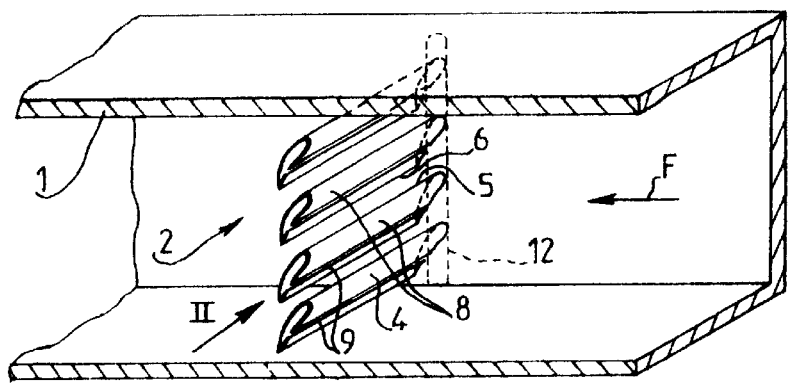
FIG. 1 is a perspective and axial section of a fluid flowing channel fitted with a first embodiment of a separator according to the invention.
Figure 2:
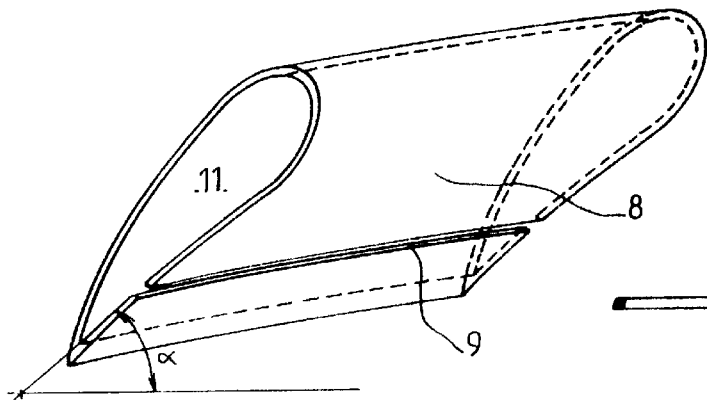
FIG. 2 is an enlarged partial perspective view of a deflecting element shown at II in FIG. 1.

Referring now to the drawings and particularly to FIG. 1, reference number 1 shows a fluid flowing channel for a flow of fluid E, and reference number 2 shows a first embodiment of a separator for separating water droplets that are contained in a flow of fluid. In this first embodiment, the separator 2 comprises a plurality of fins 4 arranged in a plane that is perpendicular to the flow of fluid F, at such a distance the one from the other that the leading edge 5 and the trailing edge 6 of two adjacent fins are slightly overlapped in the direction of the flow of fluid F.

The fins are mounted in the fluid flowing channel 1 so that their deflecting face 8 is inclined in order to deflect the flow of fluid.

Each fin is shapped as a hollow body and is provided, relatively near its downstream edge or trailing edge 6, with a slot 9 traversing the wall 10, the exterior face of which forms the deflecting surface 8. The interior 11 of each fin is connected to a space (not shown) in which there is a pressure which is lower than that prevailing in the fluid flowing channel 1.

It will easily be understood that the water droplets separated from the flow of fluid F that is deflected by the deflecting surface 8 will flow along this surface in direction of the slot 9 through which they are sucked by aspiration into the interior 11 of the fin. For evacuating the water that has reached the fin 4, the interior space of each fin 4 is connected to a water collecting duct, provided in at least one side wall of the fluid flowing channel 1 in which the fins 4 are extended and which is diammagratically shown at 12.

It should be noted that the fins 4 are profiled for reducing the loss of pressure of the flow of fluid F in the fluid flowing channel 1.

Figure 3:
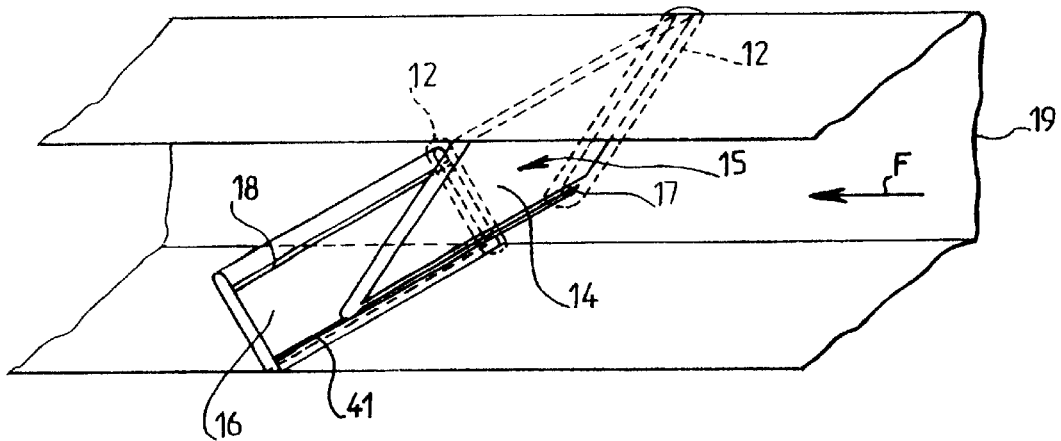
FIG. 3 is a view similar to FIG. 1, but showing the separators according to a second embodiment.

FIG. 3 shows a second embodiment in which the surface for deflecting the flow of fluid F is the front face 14 of a single inclined hollow plate 15 which is extended to a predetermined distance from the lower wall of the fluid flowing channel 1 of FIG. 1. Rearwardly shifted relative to the plate 15, there is extended, also in an inclined manner but in a direction opposite to the plate 15, a deflecting plate 16 so that to make a baffle therewith.

The hollow plate 15 is, near its trailing edge 6, provided with a slot 17 which is extended on all the width of the hollow plate 15 and crosses the wall 19 of the fluid flowing channel. In a similar manner as for the fins 4 of FIG. 1, the interior of the plate 15 is connected to an under-pressure space, and the plate 15 is provided with a duct for evacuating the water that has been accumulated in the plate 15 after having traversed the collecting slot 17.

The plate 16 has a deflecting surface provided with an aspirating slot 18 in its downstream part and may be provided with a device 41 for recovering water at its bottom, i.e. at its upstream edge for enabling the water, that has been separated by the plate 15 but not recovered by the slot 17, to be immediately collected by the plate 16. The device 41 could essentially be formed by another slot.

It is obvious that the deflecting surfaces 8 of the fins 4 and 14 of the plate 15, instead of having collecting slots, may be traversed by recesses of another type, such as for example a plurality of holes that are distributed on the surface. Water that flows along the surface, under effect of the underpressure, will then be sucked by aspiration in the interior of the fin or of the plate, through the holes. The water recovering device 41 of FIG. 3 could then be a perforated or porous area, as this is more detailed hereinafter.

For still improving the separating power of the separator, the deflecting surface may be covered with a layer of hydrophilic material such as terra cotta, that has some porosity and can absorb water. It is even possible that water will come in the interior space of the fin or of the separating plate thanks to the porosity of their deflecting walls.

Figure 4:
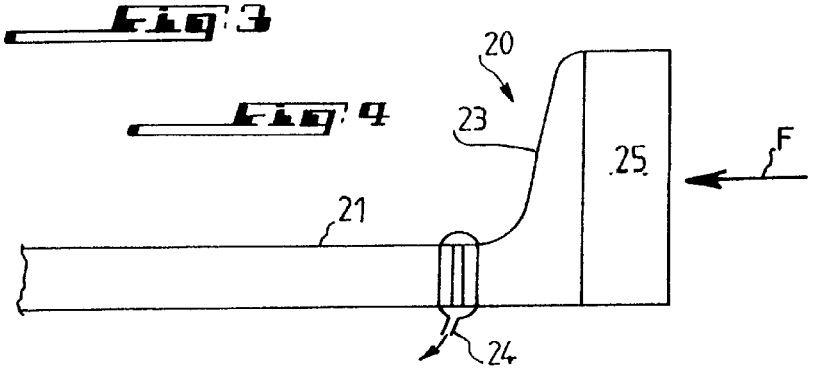
FIG. 4 is a diagrammatic view illustrating how to use the separator of the invention at the outlet of a heat exchanger.

FIG. 4 diagrammatically shows an advantageous use of a separator according to the invention, i.e. an arrangement of the separator at the outlet of a heat exchanger 25, in the transition part 20 from the great cross section of the heat exchanger to the comparatively small cross section of the flowing sheath 21. The inclined deflecting face could then be formed by the front face of the wall 23 of the transition part. This wall is hollow and is provided with water aspirating recesses for aspirating the water that has been separated from the fluid coming from the heat exchanger. The water that has been withdrawn from the fluid is then evacuated at 24.

The hydrophilic material may also be arranged on the walls of the transition part 20 upstream the aspirating slots of the collector 24.

The separator according to the invention has an advantage in that it may be placed in areas having a small flowing speed, as this is shown in FIG. 4. It should be noted that the difference of pressure between the interior of the channel and the exterior may be relatively small, for example of about 4 or 5 milibars.

Obviously, many modifications can be made to the deflectors as described and shown. The deflectors could for example be shaped as a full body pierced with a drainage channel communicating with the aspirating slots or holes.

FIG. 5 shows a particularly advantageous embodiment of a separator according to the invention. The separator, generally shown by reference number 27, is shaped as a module of a relatively small thickness in the direction of fluid flow. As illustrated, the separator comprises a plurality of hollow plates 28 arranged in a row that is perpendicular to the flowing path, in a parallel manner the one to the other and inclined with respect to the axis of the path and therefore to the direction of fluid flow, shown by the arrow F. The hollow plates 28 are juxtaposed so that the front leading edge 29 of one plate and the downstream trailing edge 30 of an adjacent plate are somewhat overlapped for preventing that some fluid may pass through the module without striking the front deflecting face 31 of the plate.

As this is particularly shown in FIG. 7, each plate 28 is advantageously formed by a flat tube having at least the deflecting front face 31 that comprises a plurality of holes 32 that cross through the wall of the tube and are regularly distributed on all the deflecting face 31. The distribution of the holes is regular on this surface. The number of holes, their diameter and the geometry of their distribution are chosen in function of the parameters of fluid flow and orientation of the tubes relatively to direction of gravity.

The plates 28 are arranged in a frame 33 of a rectangular shape having upper and lower sides which are shaped as collecting chambers in which the flat tubes forming the hollow plates 28 open. The lower chamber, shown at 34, constitutes a water collecting chamber for collecting the water that has been separated from the fluid. The connector is shown at 35. It is connected to the under pressure source.

FIG. 8 shows an advantageous use of the separator 27. Thanks to its small thickness, it can be easily integrated with the manifold 37 of a heat exchanger 38 receiving two fluids at different temperatures in 39 and 40.

The deflecting surface 31 of FIG. 7 containing the holes 32 can be covered with a hydrophilic product. The water extracting power of the separators 27 can thus be considerably increased.

The advantage of the embodiment of the separator according to FIGS. 5–7 is that the flow of fluid that contains water droplets will strike the hollow plate 28, the deflecting faces 31 of which are flat and inclined, with respect to the direction of flow, according to a predetermined angle, and that the water sucked and therewith a small amount of air is immediately sucked by the holes 32 that are uniformeously distributed on the receiving face, under effect of the underpressure that prevails within the hollow plates. Obviously, instead of using hollow plates provided with collecting holes, it could also be possible to use hollow plates made of a porous material, as this has been shown in the above description.

The so-called tubes are components that may have any suitable cross section and a very diversified manufacturing process using any suitable type of materials (metal, plastics, etc.) and assembling (soldering, brazing, gluing, etc.).

What is claimed is:

1. A separator for separating water droplets contained in a flow of fluid that flows in a flowing path, said flowing path being shaped as a channel, said separator comprising at least one inclined deflecting surface mounted within the flowing path, so that the water droplets are separated from the fluid when said fluid is deflected by said deflecting surface, said deflecting surface comprising collecting recesses formed by a plurality of holes regularly distributed along substantially the entire deflecting surface such that the flow of fluid flowing in the flowing path contacts the plurality of holes to collect water that has been separated from said flow of fluid, said recesses being connected to an under-pressure space in which is maintained an under-pressure with respect to the pressure prevailing in said flowing path.

2. The separator as set forth in claim 1, wherein said deflecting surface is formed by a surface of at least one hollow plate having a deflecting wall which is provided with traversing recesses and the interior of which communicates with said under-pressure space and a device for collecting water.

3. The separator as set forth in claim 2, wherein said deflecting surface is formed by deflecting surfaces of a plurality of inclined hollow plates that are arranged so that to be shifted the one with respect to the other, perpendicularly to the flow of fluid, with a slight overlapping, in the axial direction of the flow of fluid, of the trailing and leading edges of two adjacent plates.

4. The separator as set forth in claim 3, wherein said deflecting plates are shaped as fins of a section that is profiled for reducing the loss of pressure of the flow of fluid.

5. The separator as set forth in claim 1, wherein one deflecting surface (8, 14) is covered with a layer of hydrophilic material for avoiding a formation of droplets of water on said deflecting surface.

6. The separator as set forth in claim 3, wherein said hollow plates comprise substantially flat deflecting faces that are inclined with respect to the flow of fluid and wherein said hollow plates are juxtaposed in a same plane that is perpendicular to axis of said flowing path.

7. The separator as set forth in claim 6, wherein said plates are formed by flat tubes.

8. A separator for separating water droplets contained in a flow of fluid that flows in a flowing path, said flowing path being shaped as a channel, said separator comprising at least one inclined deflecting surface mounted within the flowing path, so that the water droplets are separated from the fluid when said fluid is deflected by said deflecting surface, said deflecting surface comprising collecting recesses for collecting water that has been separated from said flow of fluid, said recesses being connected to an under-pressure space in which is maintained and under-pressure with respect to the pressure prevailing in said flowing path, wherein said deflecting surface is a surface of a wall made of porous material, and said recesses are formed by capillary paths crossing said wall.

9. The separator as set forth in claim 8, wherein said deflecting surface is formed by a surface of at least one hollow plate having a deflecting wall which is provided with traversing recesses and the interior of which communicates with said under-pressure space and a device for collecting water.

10. The separator as set forth in claim 9, wherein said deflecting surface is formed by deflecting surfaces of a plurality of inclined hollow plates that are arranged perpendicularly to the flow of fluid, with a slight overlapping of the trailing and leading edges of two adjacent plates in the axial direction of the flow of fluid.

11. The separator as set forth in claim 10, wherein said deflecting plates are shaped as fins of a section that is profiled for reducing the loss of pressure of the flow of fluid.

12. A separator for separating water droplets contained in a flow of fluid that flows in a flowing path, said flowing path being shaped as a channel, said separator comprising at least one inclined deflecting surface mounted within the flowing path, so that the water droplets are separated from the fluid when said fluid is deflected by said deflecting surface, said deflecting surface comprising collecting recesses for collecting water that has been separated from said flow of fluid, said recesses being connected to an under-pressure space in which is maintained an under-pressure with respect to the pressure prevailing in said flowing path, wherein the separator is placed at an outlet of a heat exchanger on walls of a transition part from a flowing outlet with great cross-sectional area to a flowing sheath of smaller cross-section, said inclined deflecting surface being formed by portions of said transition part.

* * * * *